(12) United States Patent
Zimmer et al.

(10) Patent No.: US 8,321,931 B2
(45) Date of Patent: Nov. 27, 2012

(54) METHOD AND APPARATUS FOR SEQUENTIAL HYPERVISOR INVOCATION

(75) Inventors: Vincent J. Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1214 days.

(21) Appl. No.: 12/059,977

(22) Filed: Mar. 31, 2008

(65) Prior Publication Data

US 2009/0249053 A1 Oct. 1, 2009

(51) Int. Cl.
*G06F 21/00* (2006.01)
(52) U.S. Cl. ...................................................... 726/21
(58) Field of Classification Search ...................... 726/21
See application file for complete search history.

(56) References Cited

U.S. PATENT DOCUMENTS

| | | | |
|---|---|---|---|
| 2003/0188173 A1* | 10/2003 | Zimmer et al. | 713/189 |
| 2005/0138423 A1* | 6/2005 | Ranganathan | 713/201 |
| 2005/0268093 A1* | 12/2005 | Proudler | 713/164 |
| 2007/0192611 A1* | 8/2007 | Datta et al. | 713/176 |
| 2008/0235754 A1* | 9/2008 | Wiseman et al. | 726/1 |

* cited by examiner

*Primary Examiner* — Michael S McNally
(74) *Attorney, Agent, or Firm* — Grossman, Tucker, Perreault & Pfleger, PLLC

(57) ABSTRACT

In some embodiments, the invention involves a system and method for invoking a series of hypervisors on a platform. A hardware-based secure boot of a chained series of virtual machines throughout the life of the pre-operating system (OS) firmware/BIOS/loader/option ROM execution, with component-wise isolation of the pre-extensible firmware interface (PEI) and driver execution environment (DXE) cores is utilized. In an embodiment, a Cache-As-RAM (CAR) based hypervisor, executing directly from Flash memory manages sequential invocation of a next hypervisor. Other embodiments are described and claimed.

17 Claims, 6 Drawing Sheets

Phase 1 IsoPEI launch exemplary reset code:

```
;near call from reset vector
        mov     ax, cs
        mov     ds, ax
        DB      66h
510     lgdt    fword ptr cs:GDTDescriptor mov     eax, cr0             ; Get control register 0
        or      eax, 000000001h      ; Set PE bit (bit #0)
        mov     cr0, eax             ; Activate protected mode
; Now, we are in 16-bit protected mode
; Set up selectors for Protected Mode entry.
        mov     ax, SYS_DATA_SEL
        mov     ds, ax
        mov     es, ax
520     mov     fs, ax
        mov     gs, ax
        mov     ss, ax ; Execute a 16-bit far jump to reload CS to go to 32-bit protected mode
        DB      0EAh
530     DW      OFFSET @f
        DW      F000_CODE_SEL
@@:
; At this point, we are in 32-bit protected mode.
; Jmp to the Cache-As-RAM initialization code.
        jmp     _CarInit
_returnFromCarInit::
540     ;
        ;
; Enable ROM-based 1:1 map paging for VMM
; Enable CAR-based 1:1 map paging for Guest – PEI Core, so it can be updated later
; Enable 64-bit long mode
;
        mov     rax, [rsp+8]  ; Create VMCS within cache-as-RAM head
        VMXON
550     pushfd
        mov     rax, [rsp+24]
        pop     [rax]

560
        VMLAUNCH ; launch PEI as guest

; Continue execution of PEI core
```

*Fig. 2*

METHOD AND APPARATUS FOR SEQUENTIAL HYPERVISOR INVOCATION

FIELD OF THE INVENTION

An embodiment of the present invention relates generally to virtualization technology computing platforms and, more specifically, to a system and method for sequential invocation of hypervisors on the platform.

BACKGROUND INFORMATION

In existing systems, third party instructions, or code, i.e., pre-operating system software (pre-OS), is typically shipped on a read only memory (ROM) residing on the motherboard. For instance, the pre-OS ROM may comprise a basic input output system (BIOS) or unified extensible firmware interface (UEFI) implementation. This third party code typically runs at the same level as code loaded from an option-ROM or OS loader. However, the pre-boot, pre-operating system environment has now become a target for malware, as demonstrated by presentations at a recent Black Hat conference. One such presentation is entitled "Hacking the Extensible Firmware Interface," by John Heasman, which may be found on the public Internet at URL www*ngssoftware*com/research/papers/BH-VEGAS-07-Heasman.pdf. It should be noted that periods have been replaced with asterisks in URLs in this document to avoid inadvertent hyperlinks. The migration of malware at the operating system (OS) or user level to pre-OS and to the extant firmware standards which expect to run in "Ring-0" are plaguing the computing industry.

Viruses have begun to move into kernel mode, or Ring-0 level programming with the advent of rootkits, in the last several years. And in the most recent events, viruses are employing hardware virtualization to move malware into Ring "-1", including art such as Joanna Rutkowska's Blue Pill proof-of-concept virtualization malware. More information about this malware may be found on the public Internet at URL invisiblethings*org/papers/joanna%20rutkowska%20-%20subverting%20vista%20kernel.ppt. These types of viruses are particularly worrisome. As operating systems become better at warding off viruses, miscreant programmers continually try to target pre-OS code. Some existing systems load a virtual machine monitor (VMM) prior to loading the option-ROMs to protect the motherboard implementation from third party extensions. However, as systems protect the platform at earlier times in the boot phase, more sophisticated malware is developed to attack the platform at earlier phases, even still. It therefore becomes important to protect the platform at earlier and earlier phases.

BRIEF DESCRIPTION OF THE DRAWINGS

The features and advantages of the present invention will become apparent from the following detailed description of the present invention in which:

FIG. 2 is a block diagram, illustrating an exemplary embodiment of instructions invoked at reset time, according to an embodiment of the invention;

DETAILED DESCRIPTION

Figure 1:
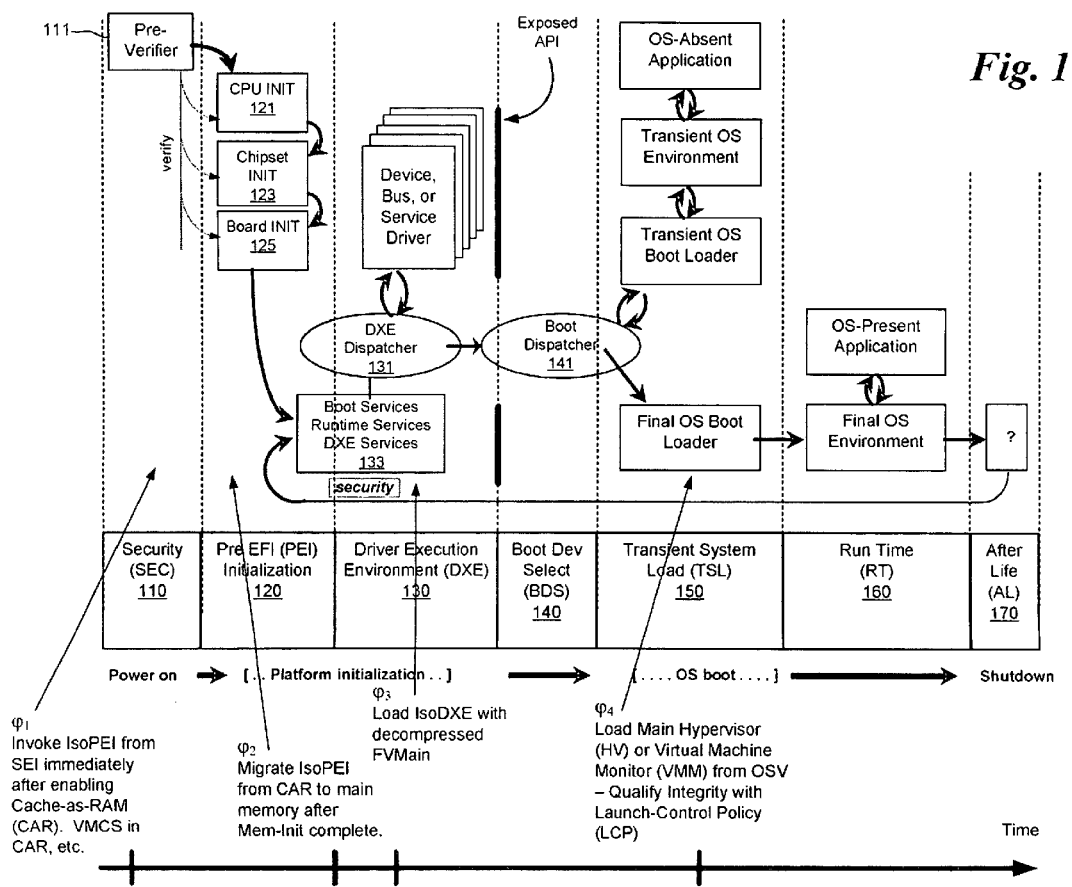
FIG. 1 is a representation of the boot and runtime phases 1-4 (φ1, φ2, φ3, and φ4, specifically) of an exemplary platform having an extensible firmware interface (EFI) architecture, according to embodiments of the invention.

One way to isolate the original equipment manufacturer (OEM) platform firmware from possibly weaponized pre-OS firmware/BIOS is by having an isolation monitor that leverages the capabilities of platforms having virtualization technology. In one embodiment, the x64 VMX and SMX capabilities, e.g., VT-x and trusted execution technology (TXT), and Itanium® VT-i capabilities of platforms are utilized to fight pre-OS malware. Specifically, the original equipment manufacturer (OEM) firmware on the x64 machine will provide protections using VT-x or VT-i in order to isolate implementations of the motherboard firmware, such as the drive execution environment (DXE) core in the Unified Extensible Firmware Interface (UEFI) Platform Initialization Specification (see, for instance, Volume 2 of Platform Initialization Specification found at URL www*uefi*org). Embodiments discussed herein are applicable to both Intel virtualization technology (see for instance, www*intel*com/technology/computing/vptech/) and other technologies used, for instance, by platforms available from AMD Corp., such as AMD-V (see www*amd*com/us-en/Processesors/Product-Information/0,30_118_8796_14287,00.html).

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In an embodiment, a series of isolation monitors, or hypervisors, are invoked in platform firmware that protect the original equipment manufacturer (OEM) code from phases involving the reset vector through the operating system (OS) loader (or other code which enables virtualization) phase. Embodiments utilize an un-broken chain of protections such that the OEM may guarantee the integrity of the firmware that was placed into the system board during manufacturing. The monitors may be OEM code, or in a future instantiation where startup microcode or an Authenticated Code Module (ACM) invokes the Phase 1 monitor, processor-only code.

In an embodiment, the initial hypervisor, or monitor, commences from the Security (SEC), or the initial portion of a Unified Extensible Firmware Interface (UEFI) boot phase. For illustrative purposes, embodiments may be described as directed to implementation on an Intel Corp. processor conforming to VT (virtualization technology) architecture. However, it will be apparent to those of skill in the art after reading the discussion herein, that embodiments of the invention may be implemented on alternative platforms. The hypervisor may be alternately referred to as a MVMM for "Measured Virtual Machine Monitor" in this discussion because the GETSEC[SENTER] instruction (Intel Corp. VT platforms) allows for recording the hash of the monitor into a Trusted Platform Module (TPM) Platform Configuration Register (PCR). Static root of trust for measurement (SRTM) technologies may also "measure" or record the hypervisor. This early code typically receives the restart invocation from different S-States (S3, S4, S5), puts the machine into protected mode via a machine settings in a Global Descriptor Table (GDT) stored in ROM, then enables cache-as-RAM (CAR), and finally invokes the pre-EFI initialization (PEI) core, which corresponds to managing the "PEI" phase of UEFI platform initialization (PI) boot flow.

In embodiments of the invention, a new step is involved, namely invoking a thin hypervisor prior to launching the PEI core. Existing systems have not used a hypervisor prior to the availability of main memory, especially since algorithms such as virtual translation look aside buffer (VTLB) consume so much memory space. With an isolation kernel, such as IsoPEI, that simply protects key data and code regions, such as the PEI metadata—Hand-Off-Block (HOB, which is in CAR), the size of IsoPEI and the bookkeeping information is small enough to share the Cache-As-RAM (CAR) space with the PEI core and the various PEI modules.

The thin hypervisor is also referred to herein as IsoPEI for "Isolation of the PEI phase." IsoPEI may run in Ring-1 beneath PEI modules and the PEI core running in Ring-0. The integrity of IsoPEI itself may be validated on future systems using Startup Authenticated Code Module (ACM) or Manageability Engine (ME)-based root-of-trust, but an aspect of embodiments of the invention is an early, primordial hypervisor.

VT architecture platforms available from Intel Corporation added additional "Rings" to the formerly used taxonomy of Ring 0-3. For examples, most privileged code in the Windows® operating system, namely the OS kernel ntoskern-1.exe, runs in Ring-0, whereas less privileged application code like Win32 libraries run in Ring-3. This architecture was used prior to the advent of hardware virtualization. It should be noted that "Software" Virtualization prior to deployment of Intel® VT capable platforms, such as VMWare, executed the virtual machine monitor (VMM) in Ring-0 and pushed Windows® Kernel to Ring-1 using a technique called "ring compression." These techniques have performance and portability issues, for instance, involving patching the Windows® kernel into memory to make this technique work.

Intel® VT capable platforms added additional rings to former taxonomy of Ring 0-3. With the advent of hardware virtualization, "ring" taxonomy refers to Rings-below, and more privileged, than Ring 0-3. This allows a VMM to run "below" Ring-0 and thus host a Ring-0 OS kernel like Windows® OS without touching the Windows® binary.

In existing systems, third party code controls the system boot up until the operating system (OS) loader loads the operating system. The entire boot process may have binary extensibility up to and including applying the reset vector. It is desirable to provide binary code to activate the silicon (chipset) and control third party device binary code, for instance third party device vendor code, at the earliest phase possible. Embodiments of the invention use a chain of hypervisors (simple virtual machine monitors) to maintain control throughout the boot phases.

Referring now to FIG. 1, there is shown a representation of the boot and runtime phases ($\phi$1, $\phi$2, $\phi$3, and $\phi$4, specifically) of an exemplary platform having an extensible firmware interface (EFI) architecture. FIG. 1 illustrates the flow of execution of a system according to an embodiment of the invention. A pre-verifier 111 may be run at power-on and the security (SEC) phase 110. A pre-verifier is typically an authenticated code (AC) module that initializes and checks the environment. In the case of Intel® x64 systems with an authenticated code module (ACM) and a firmware interface table (FIT), startup microcode in the processor examines the Flash memory to detect presence of FIT, and if there, look for an ACM entry. Upon detecting the StartupACM, startup microcode invokes the EnterACCS instruction to commence execution of the ACM. In existing systems, the pre-verifier and SEC phase is the Core Root of Trust for Measurement (CRTM), namely enough code to startup the Trusted Platform Module (TPM) and perform a hash-extend of BIOS. More information on TPMs may be found at URL www*trustedcomputinggroup*org. On an Itanium® system, there is also a FIT, but instead of a Startup ACM, there is a Processor Abstraction Layer (PAL) component, namely the PAL-A, that implements the authentication of the SEC code in the same fashion as the ACM did on x64 systems. More information about firmware address space and processor abstraction layer with processor-specific PAL_A components may be found in "Intel® Itanium® Architecture Software Developer's Manual, Volume 2: System Architecture," Revision 2.1, October 2002, page 2-256 (see URL people*freebsd*org/~marcel/refs/ia64/sdm-2.1/245318.pdf.

AMD Corp. manufactured x64 systems do not have a FIT or ACM's. The existence of the FIT and ACM (on x64) or PAL-A (on Itanium®) represent a true "hardware-root-of-trust" since Intel®-signed components (ACM or PAL-A, respectively) are each invoked by startup microcode built into the Intel® processor.

The pre-verifier 111 runs in phase 1 ($\phi$1) upon power on. The pre-verifier invokes cache-as RAM (CAR) and puts the platform into protected mode on x64 systems. At this early phase, in embodiments of the invention, an IsoPEI is invoked by the SEC, or security initialization code, immediately after enabling cache-as-RAM (CAR) (using memory type range registers (MTRR) programming on x64 and a PAL_PROC call on Itanium). The virtual machine control structure (VMCS) may be in the CAR. The VMCS (see, for instance, at URL www*intel*com/cd/ids/developer/asmo-na/eng/197666.htm) is defined for x64 to determine the conditions under which control must be transferred to the hypervisor or virtual machine monitor. The Itanium® processor has a similar structure called the Virtual Processor Descriptor (VPD) (see for instance, at URL, www*intel*com/cd/ids/developer/asmo-na/eng/124273.htm) to the VMCS. AMD systems have a similar structure referred to as a Virtual Machine Control Block (VMCB) for their AMD-V hardware virtualization technology.

Referring to FIG. 2, there is shown an exemplary embodiment of instructions invoked at reset time, according to an embodiment of the invention. First, a near call from reset vector is performed at 510. At this time, the processor gets control register 0 and sets the PE bit (bit #0). Protected mode is then activated. At this point, the processor is in 16-bit protected mode. Selectors for Protected Mode entry are set, at

520. At 530, a 16-bit far jump is executed to reload CS (code selector) to go to 32-bit protected mode. Once in 32-bit protected mode a jump instruction is executed to execute the CAR initialization code, at 540. At 550, in embodiments of the invention, the processor enables ROM-based 1:1 map paging for a hypervisor. The hypervisor will setup CAR-based 1:1 map paging for Guest—PEI Core, so it can be updated later; and enables 64-bit long mode. The VMCS is created within cache-as-RAM head. The VMCS defines the structure and control of the hypervisor (IsoPEI), defines the mapping of the platform, and defines the privileges of the hypervisor and guests. It will be understood by those of skill in the art that various methods (with varying code) may be used to initiate the hypervisor, depending on the architecture of the platform. For instance, in platforms available from AMD, a VMCB (virtual machine control block) may be initialized in the place of the VMCS. The VMXON command (in Intel® VT platforms) initiates the virtualization hardware support to enable the virtualization capabilities. Then the hypervisor, IsoPEI, uses VMLaunch command to launch the guest virtual machine to execute the PEI code, at 560, to commence the pre-EFI initialization code. The IsoPEI hypervisor may ensure that the PEI code does nothing malicious, for instance, access protected memory, or the like.

Based on the VMCS, the hypervisor may be invoked whenever an attempt to access a protected area of memory is made, or attempts are made to access other protected hardware, buses or devices to guard against malware at an early time.

Referring again to FIG. 1, in phase 2 ($\phi 2$), the processor 121, chipset 123 and board 125 may be initialized (launched by the pre-verifier) in the pre-EFI initialization (PEI) stage 120. The processor, chipset, board and initialization code may now be run by the IsoPEI module in a guest virtual machine. The VMCS enables the hypervisor to intercept malicious accesses through the hardware virtualization support. The IsoPEI is migrated from CAR to main memory after memory initialization is complete. Memory is typically initialized during chipset init 123.

In phase 1 and 2, the platform goes through a large transformation from an inert machine to a useful platform. At power-on, the DRAM is not yet initialized; the PCI buses are not yet functional; the memory map changes as more of the platform fabric is discovered, etc. A hypervisor may be launched at the earliest phase and validated by hardware microcode to provide very early protection in the boot phase. Protection continues in successive phases with additional hypervisors that are authenticated and launched in a chain from the original hypervisor.

The first hypervisor (IsoPEI) may be authenticated by microcode in phase 1. The first phase of this hypervisor executes in CAR. Once memory is discovered and initialized, IsoPEI migrates itself into main system memory. The latter portion of PEI discovers the main firmware volume and a more stateful, capable hypervisor. The hypervisor (IsoDXE) may be invoked in memory to protect the DXE phase (phase 3, $\phi 3$). After memory is discovered, all data must be moved from CAR to main memory. This is typically performed at PEI, in phase 2. Once this is complete, the main firmware volume in Flash memory is discovered which contains the DXE drivers. The volume is decompressed with many drivers. The IsoDXE driver is the first DXE module to be loaded and launched as a hypervisor. The IsoDXE driver is multiprocessor (MP) and I/O device aware (e.g., support processor virtualization with VT-x and I/O virtualization with VT-d), so that additional processors may be initialized in the platform. The IsoDXE driver launches the DXE dispatcher 131.

After PEI, the boot services, runtime services and driver execution environment (DXE) services 133 are launched in phase 3 ($\phi 3$) at the DXE stage 130. The DXE Dispatcher is run to load device, bus and service drivers. Some of these drivers may utilize binary code or option-ROM code that must be authenticated and controlled to avoid execution of malware. The DXE dispatcher typically launches the runtime, and other services 133. It is important for the runtime services to be authenticated and to be retrieved from a secure location. In embodiments of the invention, the IsoDXE driver may launch or monitor the launching of the runtime and other services. The IsoDXE driver, or hypervisor, may have a runtime table comprising function pointers and may ensure that the runtime and other services are retrieved from the motherboard ROM to protect these services. The IsoDXE driver protects against third party EFI drivers masquerading as runtime services.

Once the services 133 are launched by the DXE dispatcher, the DXE dispatcher may launch the boot dispatcher 141. The boot dispatcher 141 is typically an EFI driver that may launch other EFI drivers and API (application program interface) EFI services, for instance, option-ROM code or OS loaders.

A successive hypervisor may be invoked after DXE phase, perhaps to persist into runtime, or a third party hypervisor may be invoked, such as VMWare, in phase 4 ($\phi 4$). As discussed above, it will be understood that phases 1, 2 & 3 are important for guarding the platform boot. In some cases, the IsoDXE hypervisor may not cede control to another hypervisor or virtual machine monitor; this would be the case of a platform without a full hypervisor of its own, such as Microsoft® Hype-V, VMWare ESX Server, or Xensource's Xen. IsoDXE may continue throughout the life of the platform to protect platform firmware data structures in memory, such as the aforementioned runtime services table, in addition to other data structure germinated by the platform firmware, such as Advanced Configuration & Power Interface (ACPI) (see for instance, URL www*acpi*info) and System Management Basic Input Output System (SMBIOS) tables (see for instance, URL www*dmtf*org).

Because the IsoPEI and IsoDXE code may be stored in the motherboard ROM of a platform, the platform vendor may maintain control of the boot process to ensure that third party code cannot maliciously alter the boot. Thus, the EFI and runtime services are protected. More complex code, such as an operating system, will be too large to be stored and shipped on the motherboard. Thus, it is then left to the vendors providing the operating systems or virtualization software to protect against runtime malware. In embodiments of the invention, when the StartupACM and PAL-A (for x64 and Itanium® processors, respectively) are stored in Flash memory, but validated by startup microcode in the processor prior to execution, the ROM is effectively bound to the processor (i.e., swapping Flash memory via the "ROM Swap" attack and putting in errant PAL or ACM code would be detected by the processor).

The boot device select (BDS) phase 140 is responsible for choosing the appropriate operating system. It will be understood that the hypervisor shipped with the motherboard, for instance, IsoDXE is still monitoring processor execution at this phase. Thus, only trusted operating systems will be permitted to be launched on the platform. IsoDXE helps to enforce the trusted OS loader launch in via enforcement of signed UEFI OS loader validation, maintaining a list of permissible image hashes, using Launch-Control Policy NV Data object verification, or other means. The OS boots at the transient system load (TDL) stage 150, phase 4 ($\phi 4$).

Upon a system failure during OS runtime (RT phase 160), such as what is referred to as BSOD (Blue Screen Of Death)

in Windows® or Panic in Unix/Linux, the firmware PEI and DXE flows may be reconstituted in an after life (AL phase 170) in order to allow OS-absent recovery activities. Is the case of IsoDXE that has not unloaded at ExitBootServices, IsoDXE may be used to protect the runtime from the failed OS.

One embodiment of an IsoDXE hypervisor is described in co-pending U.S. patent application Ser. No. 11/897,355, entitled "Method For Firmware Isolation," filed by Jiewen Yao et al. on 30 Aug. 2007.

Embodiments may use virtualization technology, such as available in processors from Intel Corporation, e.g., a so-called virtualization technology (VT)-x for x64 processors and VT-I for Itanium® processors, in order to isolate the standards-based implementation of UEFI interfaces, namely the UEFI Platform Initialization (PI) Architecture Driver Execution Environment (DXE) components. Because of space constraints in read only memory (ROMs) in existing systems, the implementation may act as an isolation kernel that maps the machine memory in a 1:1 virtual-to-physical mapping without device emulation, versus a full hypervisor (HV) or virtual machine monitor (VMM) that provides non-1:1 memory mapping and rich device models.

Embodiments may launch a platform isolation kernel. Such isolation barriers are erected prior to launching any untrusted, third party code. In implementations executing under a UEFI model, first a security phase (SEC) may occur upon machine start or restart, as discussed above. In this security phase, initial operations after platform reset or power on may be performed to ensure firmware integrity is intact. Then the pre-EFI initialization environment (PEI) may be performed in which code may perform minimal processor, chipset and platform configuration to support memory discovery. In embodiments of the invention, the PEI is executed in the MVMM hypervisor. Then a driver execution environment (DXE) phase may be performed. In this phase, much of firmware code may operate in the pre-boot environment. Such code may be implemented as multiple drivers, which complete initialization of the platform and devices. For example, device, bus or service drivers may be executed responsive to dispatch by a DXE dispatcher.

Prior to the end of such DXE phase, an isolation driver or kernel in accordance with an embodiment of the present invention may be launched prior to loading of any third party code. In various embodiments, in the context of a UEFI environment, this isolation code may be referred to as IsoDXE code, and is launched after the IsoPEI hypervisor. In various embodiments, such code may run in a so-called ring "-1" privilege level, rather than either a system privilege level, i.e., a Ring-0 privilege level in which the PEI and DXE phases operate or a user privilege level, i.e., a Ring-3 privilege level in which third party applications run. This ring may be a higher privilege than Ring-0. In various embodiments, IsoDXE code may be executed using processor virtualization technology to push the UEFI implementation into Ring "-1", isolated from third party code.

After such isolation code is executed, the DXE phase may conclude and control passes to a boot device selection (BDS) phase in which a boot dispatcher transitions execution to an OS boot phase, which may include a transient system load (TSL) phase in which a transient OS boot loader executes in a transient OS environment and prepares for a final OS boot loading in which the OS code is executed and accordingly, a run time may proceed in which applications execute using the OS. While described in the context of a UEFI environment, the scope of the present invention is not limited in this regard, and in other embodiments, isolation code may be implemented in different code environments.

In some embodiments, a Clark-Wilson integrity analysis of the pres-OS environment may be performed. Certain controlled data items (CDIs), such as the UEFI System Table (uefi_system_table_data_t) and other internal state objects for the DXE implementation may be provided with appropriate protection. Other pages to be protected may include an implementation of the DXE core, such as its text section from the Portable Executable (PE) Common-Object File Format (COFF) executable. Also, other images beyond the isolation kernel and DXE core code and data can be protected, such as the System Management BIOS (SMBIOS) tables, Advanced Configuration and Power Interface (ACPI) tables, and other DXE drivers that ship with the platform and are loaded by the OEM. The latter class may be distinguished from third party drivers on disk or adaptor cards whose provenance may not be known, thus they are treated as hostile with respect to the OEM DXE code and data (i.e., EFI drivers loaded in TSL may be hostile to those loaded earlier in DXE). The IsoDXE hypervisor is the guard which protects these code and data types from malicious or unauthorized third party DXE drivers.

Additional CDI's in the system that IsoPEI may protect include PeiCore_code_t and CapsuleUpdateAndVerify_code_t. These latter executable modules are responsible for providing module dispatch and update of PEI modules. IsoPEI can also protect the S3 hibernate data structures, including the boot script and other DXE drivers. On the Flash/capsule update flow, IsoPEI and IsoDXE may be used to protect the Flash memory part and the authentication driver. In existing systems, this protection is done with "trusted" third party code and system management mode (SMM) on x64 (and no SMM on Itanium). More information may at D. Clark and D. Wilson, "A Comparison of Commercial and Military Security Policies," IEEE Symposium on Security and Privacy, 1987; and at Vincent Zimmer, "Platform Trust Beyond BIOS Using the Unified Extensible Firmware Interface," in Proceedings of the 2007 International Conference on Security And Manageability, SAM'07, CSREA Press, June 2007, ISBN: 1-60132-048-5, pages 400-405.

Figure 3:
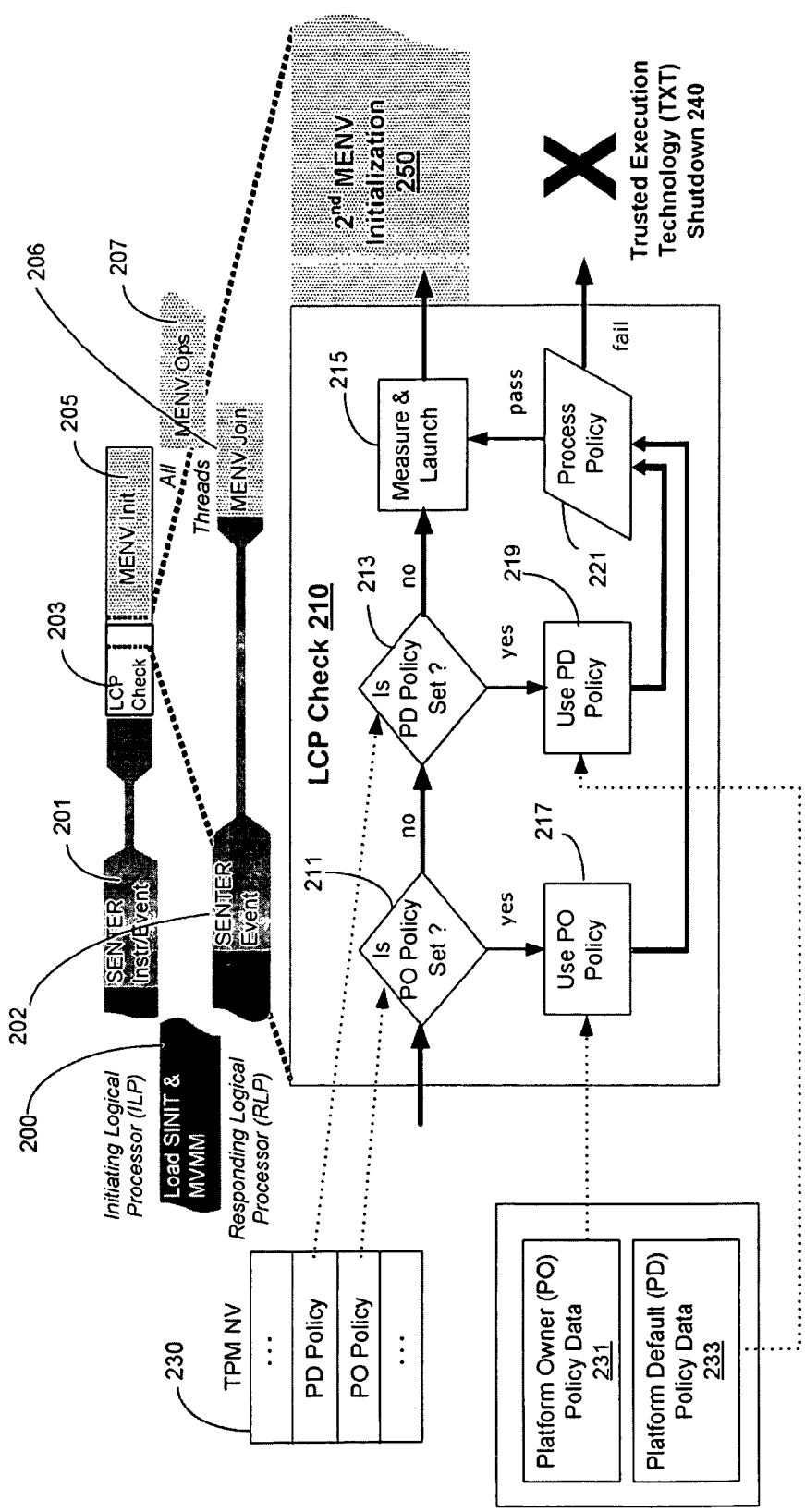
FIG. 3 a block diagram depicting a launch control policy (LCP) for the successive hypervisors, according to an embodiment of the invention.

Referring now to FIG. 3 there is shown a block diagram depicting a launch control policy for the successive hypervisors, according to an embodiment of the invention. A Trusted Platform Module (TPM) may have associated non-volatile (NV) memory (TPM NV) 230. The TPM NV 230 may comprise policies that drive the authentication and validation of hypervisors and virtual machine monitors (VMMs) in the platform. A policy may comprise a list of authorized hypervisors. The list may comprise a hash value for the authorized hypervisor. Thus, when a hypervisor is to be loaded, the TPM may ensure that it is valid and not malware.

When transitioning from phase 2 to phase 3 or phase 3 to phase 4, in an Intel® Architecture platform having VT capabilities, such as x64 or IA32 platforms, a SENTER command 201 may be used to leverage a launch control policy (LCP) 203 to check the identity of the hypervisor that is about to load. This may be performed using a combination of hardware and macrocode, i.e., authenticated code (AC) modules. In embodiments without the hardware portion, a digital signature check may be used from the first hypervisor to the next hype-visor, for instance, on Itanium® processors.

In an embodiment, the second measured virtual machine monitor (MVMM) is loaded at 200. In this illustration, the initial hypervisor is referred to as the first MVMM, or trusted software module. At this time the logical processor is initiated (i.e., initiating logical processor, ILP). When the first MVMM is ready to launch a next hypervisor, also referred to as a subsequent trusted software module, the SENTER command 201 will be intercept by the first MVMM. The first MVMM will send INIT command to all RLP (Responding Logical Processor). Then the first MVMM will perform the LCP check 203. Once the LCP has authenticated the next level hypervisor, the first MVMM will launch the second measured environment MENV at 205. Once MENV Init 205 has completed, the MENV is operational at 207, e.g., the next level hypervisor is in run mode.

The LCP process is shown in more detail at 210. A TPM may be pre-configured to identify a platform owner (PO) policy 231 to enable authentication of the successive hypervisors. If the platform has not been specially configured, a default policy, e.g., platform default (PD) policy 233 may be used. Appropriate policy configuration information may be stored in the TPM NV area 230. The policy information may contain lists of valid allowed MMVMs and MENVs. These lists may be hash codes. The platform may have a policy that only allows virtualization to be enabled when the hypervisor, MVMM, or VMM has a hashed value in the policy list.

It is determined whether a platform owner (PO) policy is set at 211. If not, then it is determined whether a platform default (PD) policy is set in 213. If not, then the hypervisor to be launched is assumed to be valid. The hypervisor is then "hashed," e.g., measured at 215, and the hash value is stored, for instance in a Platform Configuration Register (PCR) in a Trusted Platform Module, for TPM version 1.2 or greater (see for instance, TPM specifications at URL www*trustedcomputinggroup*org). The hypervisor is then launched. If a PO policy is set, as determined in 211, then the hypervisor is measured (i.e., the policy is checked at 221) against the valid entries in the PO policy data 231. If a PD policy is set, as determined in 213, then the hypervisor is measured (i.e., the policy is checked at 221) against the valid entries in the PD policy data 233. If the policy data measured at 221 does not match, then the hypervisor is not authorized and the platform may shutdown 240. In some embodiments, a default configuration may boot instead, to enable diagnostics, but without virtualization enabled. In an embodiment, a register may be set to indicate the reason for shutdown, and reset mode may be initiated. If the problem persists, a service processor may be utilized to enable remote diagnostics. In some embodiments, for low-end platforms, notification may be an indicator light, or some other low cost event.

When the hash value of the hypervisor, or MVMM, to be launched is authenticated at 215, the first MVMM will launch the second MVMM environment (MENV) at 250 (205). Each time a next level MVMM or hypervisor is to be launched, the SENTER command may be used. Once the SENTER command is intercepted, the LCP check is initiated to assure that the code is legitimate.

The ILP (initiating logical process) that issued the SENTER command also performs the MENV init (measured environment initialization). In a multi-processor or multi-core system, the RLPs (Responding Logical Process) acknowledge this SENTER event 202 and are put into SENTER SLEEP state to wait for the WAKEUP command from ILP. After a passing LCP check 203, the ILP in MVMM should issue a WAKEUP command to wake up the RLP 205. Once RLPs are awakened, they will join the MENV environment 206. After all the processors or cores rendezvous at 207, the whole system has entered the secure environment 207. Additional information regarding the ILPs and RLPs may be found in U.S. Pat. No. 7,069,442, entitled "System and Method for Execution of a Secured Environment Initialization Instruction," to James A. Sutton II, et al.

In embodiments, either microcode, SEC or StartupACM launches first hypervisor (MVMM), which may be referred to above as soPEI. The microcode, SEC or StartupACM components start out as most privileged. The "launch" is done via the equivalent of the "SENTER" instruction 201. When the IsoPEI hypervisor is launched, it too is most privileged. Once the PEI core is ready to be migrated to the DXE phase, the IsoPEI hypervisor becomes the "caller" (or launcher) of the IsoDXE hypervisor. IsoDXE is "callee." IsoPEI intercepts SENTER from IsoDXE and launches it. Instructions in IsoDXE code issuing the "SENTER" is less privileged. IsoPEI intercepts the SENTER and if the LCP is successful, then passes control to IsoDXE. Examples of embodiments where the firmware is the "caller" and issues a SENTER command may be found in co-pending U.S. patent application Ser. No. 11/968,032, entitled "Enhanced Network And Local Boot Of Unified Extensible Firmware Interface Images," filed by Vincent J. Zimmer, et al. and filed on 31 Dec. 2007.

Figure 4:
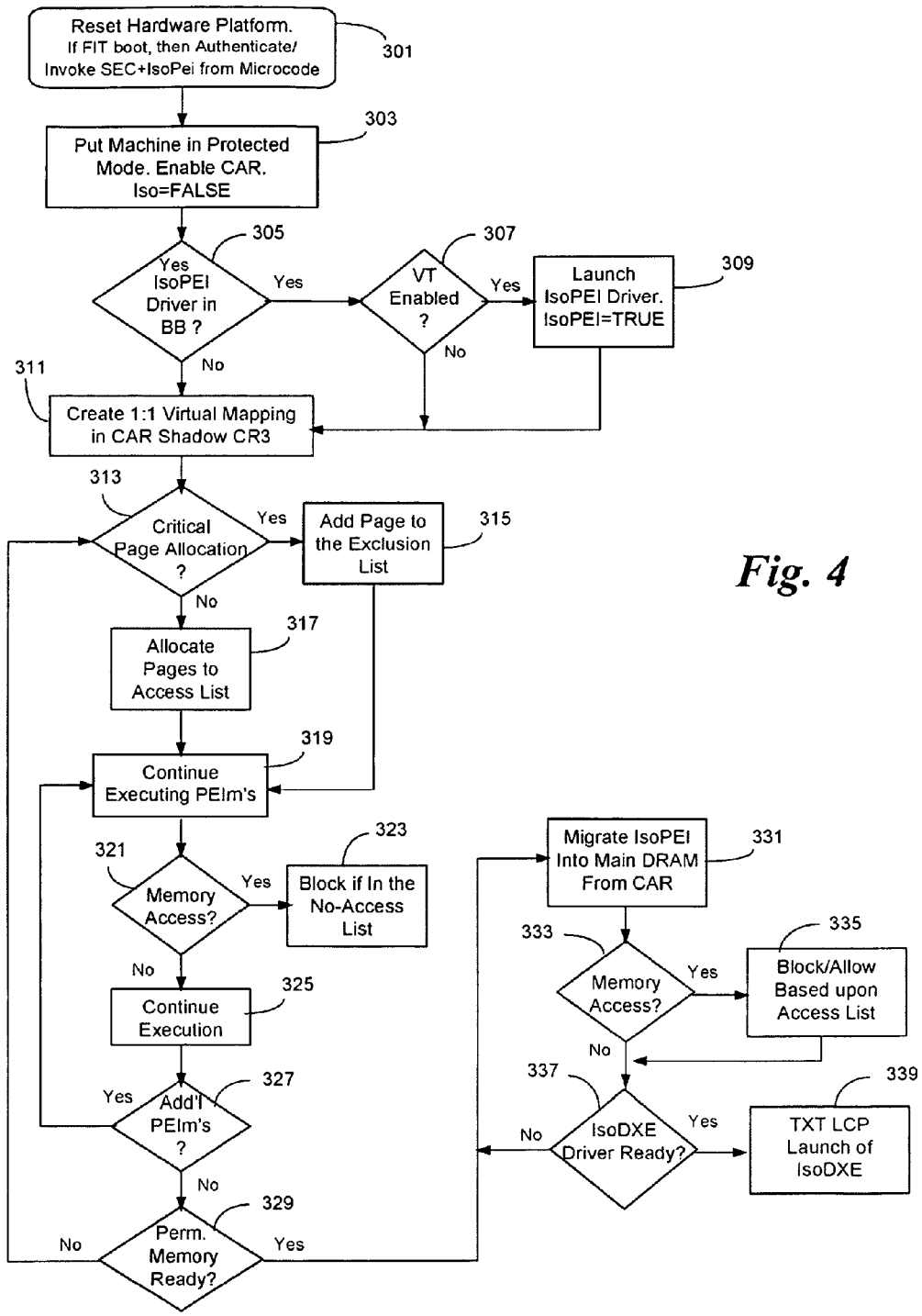
FIG. 4 is a flow diagram of an exemplary method for invoking successive hypervisors to protect platform boot, according to an embodiment of the invention.

Referring now to FIG. 4, there is shown a flow diagram of an exemplary method for invoking successive hypervisors to protect platform boot, according to an embodiment of the invention. First, the hardware platform is rebooted or reset in block 301. If the Firmware Interface Table (FIT) is detected and there is an associated StartupACM (on x64 processors) or PAL-A (on Itanium® processors), then the boot code is authenticated; authentication may include digital signature verification of the BIOS module, or simply audit or "measurement" of the module, where "measurement" is the hash-extend operation which places the Secure Hash Algorithm digest of the module into a PCR. For more information on the secure hash algorithm, see www*itl*nist*gov/fipspubs/fip180-1.htm. The security phase SEC is invoked with the IsoPEI hypervisor (aka MVMM) from the microcode. The platform is put into protected mode, and cache-as-RAM (CAR) is enabled in block 303.

It is determined whether the IsoPEI driver is in the boot block (BB), in block 305. If so, it is determined whether virtualization technology is enabled, in block 307. If so, then the IsoPEI driver is launched from the boot block, or Flash memory, in block 309. A flag may also be set to indicate that an IsoPEI driver is running.

If VT is not enabled, for instance if the IsoPEI driver is not in the boot block, then the platform may boot as in legacy mode.

Once the IsoPEI driver is launched on an x64 platform, the driver uses the ROM based 1:1 mapping Page Directory Base Register (PDBR). IsoPEI may create a virtual mapping in CAR to shadow the Page Directory Base Register (PDBR), or control register 3 (CR3) in some embodiments, in block 311, for the guest system to continue execute PEI driver. If the IsoPEI driver does not exist, the usual PEI driver will use the ROM based 1:1 mapping PDBR to continue executing.

When the IsoPEI driver is running, a determination is made as to whether a page allocation is a critical page allocation, in block 313. The IsoPEI checks to see if the page allocation from CAR is lawful. If a page is deemed critical, it may be added to the Exclusion List in block 315, to guard against unlawful access. For instance, internal data IsoPEI structures may be deemed to be excluded from use by other modules. Other pages are allocated to the access list in block 317. PEI modules (PEIM) continue to execute in block 319. If the PEIM attempts to access memory, as determined in block 321, the memory access is blocked in block 323, if the memory was put on the no-access list (e.g., exclusion list). Otherwise, execution continues.

If there are additional PEIMs, as determined in block 327, then execution continues at block 313. If not, then a determination is made as to whether permanent memory (system memory) is ready, and initialized, in block 329. If not, the loop continues until system memory is ready. Once system memory is ready, the IsoPEI driver is migrated into system memory, typically DRAM, from CAR, in block 331, and the CAR based resources, such as page table and VMCS, are migrated to DRAM for the guest. The IsoPEI continues to block unlawful memory accesses, even when in system memory at blocks 333 and 335, as at blocks 321 and 323. If the successive hypervisor, for instance IsoDXE is not ready to be launched, as determined in block 337, execution loops until IsoDXE is ready to be launched in block 339.

When the IsoDXE driver is ready to be launched, the trusted execution technology (TXT) capabilities are used to assist in a trusted launch. The launch control policies (LCP), as discussed in conjunction with FIG. 3, are used to determine whether the IsoDXE, and subsequent hypervisors, are valid (i.e., lawful). If LCP succeeds, then the next successive hypervisor is launched.

It should be understood that in existing systems, the tests for critical page allocation (313) and adding access information to access and exclusion lists (315, 317), as well as controlling the memory accesses (321, 323, 333, 335) are not performed. In existing systems, the exclusion list and no-access list are not maintained. Instead, memory allocation is performed with no safeguards. Thus, the present method results in additional safeguards during the boot phase.

In existing systems, the safeguards are enforced by proper use of application programming interfaces (API's), e.g., AllocatePage( ) or AllocatePool( ) in the UEFI specification, but errant code can go beyond these allocations of memory and corrupt data. Embodiments of the present invention add hardware enforcement of memory allocation boundaries for code and/or data.

Figure 5:
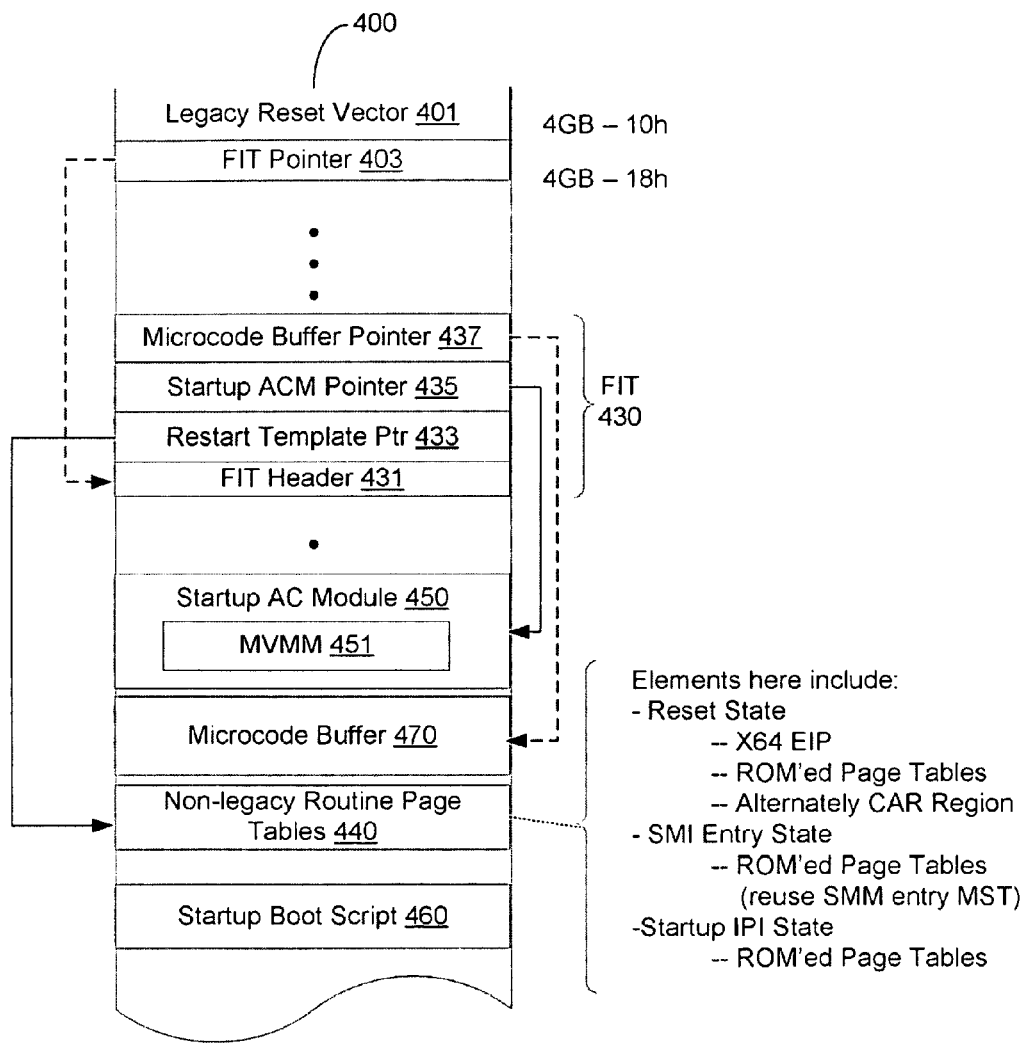
FIG. 5 is a block diagram illustrating a firmware interface table (FIT) and boot and startup pointers in a boot block in non-volatile, or Flash memory, according to an embodiment of the invention.

In an embodiment, platforms may have microcode to assist in secure launch of a first hypervisor during boot. Referring to FIG. 5, there is shown a block diagram illustrating a firmware interface table (FIT) and boot and startup pointers in a boot block in non-volatile, or Flash memory. Implementation of a data structure, as illustrated, may be referred to as a "FIT Boot." In an embodiment, use of the illustrated data structure may be integrated with hardware features to enable microcode to perform LCP tasks, as described above, in microcode, rather than code stored on Flash memory. This enables the hardware vendor mode more control over the boot, since, Flash memory is more susceptible to malware than microcode embedded in the hardware.

The FIT table 400 is code that is known to the platform microcode. A pointer to a startup module and SEC code module is used to allow the microcode to execute the SEC code. Thus, the IsoPEI code may check the integrity of IsoDXE code using this microcode structure. Also, the microcode may check that the BIOS code meets some policy.

An exemplary discussion of a FIT Boot may be found in co-pending U.S. application Ser. No. 11/949,317, entitled, "BIOS Routine Avoidance," filed by Vincent J. Zimmer, et. al.

on 3 Dec. 2007. Referring again to FIG. 5, the firmware 400 may include a firmware interface table (FIT) 430 (beginning at the FIT Header 431) in many embodiments. The FIT may include pointers to locations elsewhere within firmware 400 where segments of code (i.e. routines) are located that handle events in the system. The initial FIT pointer 403 is designed such that startup microcode/hardware in the main processor, or central processor unit (CPU), can discover its location prior to accessing any other part of the Flash boot ROM, including but not limited to third party macrocode at the reset vector 401. In many embodiments, a portion of firmware 400 includes a number of non-legacy startup state page tables 410 for x64 long-mode which requires have paging enabled; such tables are not required for the non-legacy 32-bit protected mode that can execute in physical mode (e.g., no need for virtual memory/page tables). The non-legacy startup state page tables 410 may include routines that are launched at certain occasions to handle events and hand the system to an operating system in a non-legacy mode. The details regarding the items stored in firmware 400 are discussed further below.

In many embodiments, legacy mode refers to 16-bit real mode. In many embodiments, a non-legacy mode may include any mode that is not 16-bit real mode. Thus, non-legacy modes can include 64-bit long mode or 32-bit protected mode, among other possible modes.

FIG. 5 describes one embodiment of the virtual memory allocation for the system ROM including non-legacy mode handler routines. In many embodiments, the system ROM (i.e. firmware 400) is given a 16 MB allocation at the top of 32-bit memory space. The very top of memory space, 4 GB (gigabyte)—10h, may contain the IA-32 (Intel® Architecture 32-bit) reset vector 401 for legacy compatibility.

In many embodiments, a FIT pointer 403 is located below the reset vector 401. The FIT pointer 403 may point to the start of the FIT 430, e.g., the FIT Header 431, located elsewhere in firmware 400. Both the reset vector 401 and the FIT pointer 403 are located in the protected boot block in firmware 400, which requires these locations to remain fixed. Thus, although the FIT pointer 403 cannot be moved, the location of the FIT 430 may be put at any memory location below the protected boot block.

In the embodiment shown in FIG. 5, the FIT pointer 403 points to the FIT header 431, located at the bottom of the FIT 430. The FIT header 431 is an architecturally required entry in the FIT 430. Elsewhere in the FIT 430 there may be a microcode buffer pointer 437, a startup ACM (authenticated code module) pointer 435, a restart template pointer 433, among other possible pointers. Each pointer points to a specific location below the FIT 430. In many embodiments, the microcode buffer pointer 437 points to a microcode buffer 470, the startup ACM pointer 435 points to a startup ACM 450, and the restart template pointer 433 points to one or more page tables in the firmware 400 that include routines for a non-legacy mode startup state 440.

In some embodiments, a FIT entry may point to a startup script (or boot script) 460. A boot script is a set of binary operations, such as defined in the Intel® Platform Innovation Framework for EFI Boot Script Specification. The boot script may include operations such as the following:

```
#define EFI_BOOT_SCRIPT_IO_WRITE_OPCODE           0x00
#define EFI_BOOT_SCRIPT_IO_READ_WRITE_OPCODE      0x01
#define EFI_BOOT_SCRIPT_MEM_WRITE_OPCODE          0x02
#define EFI_BOOT_SCRIPT_MEM_READ_WRITE_OPCODE     0x03
```

-continued

| | |
|---|---|
| #define EFI_BOOT_SCRIPT_PCI_CONFIG_WRITE_OPCODE | 0x04 |
| #define EFI_BOOT_SCRIPT_PCI_CONFIG_READ_WRITE_OPCODE | 0x05 |
| #define EFI_BOOT_SCRIPT_SMBUS_EXECUTE_OPCODE | 0x06 |
| #define EFI_BOOT_SCRIPT_STALL_OPCODE | 0x07 |
| #define EFI_BOOT_SCRIPT_DISPATCH_OPCODE | 0x08 |
| #define EFI_BOOT_SCRIPT_TABLE_OPCODE | 0xAA |
| #define EFI_BOOT_SCRIPT_TERMINATE_OPCODE | 0xFF |

These operations are defined such that the startup ACM in 450 or CPU hardware/microcode in processor core can execute these operations prior to running any third party macrocode or BIOS. These may provide patches or work-arounds in a chipset (whether it be portions of the chipset in a processor complex (e.g., "uncore") or a classical distributed chipset such as I/O complex in 108).

In some embodiments, one or more non-legacy processor event handler routines are in the firmware 400. These routines may include a non-legacy reset state handler routine, a non-legacy system management interrupt (SMI) entry state handler routine, and/or a non-legacy startup interprocessor interrupt (IPI) state handler routine (not shown).

The non-legacy reset state handler routine may include a code flow capable of handling a system reset (soft or hard reboot) in the native mode (a non-legacy mode) that the system will boot the operating system (OS) to, rather than legacy 16-bit real mode. Thus, instead booting the system boot in legacy mode and requiring a transfer from legacy mode to the desired native mode the OS operates within, the native mode is used as the mode to handle the system reset.

The non-legacy SMI entry state handler routine may include a code flow capable of handling an SMI in the native mode that the system will boot the OS to, rather than legacy mode. Again, instead of handling the SMI in legacy mode and requiring a transfer from legacy mode to native mode after an SMI occurs, the native mode is used as the mode to handle the SMI.

Finally, the non-legacy startup IPI state handler routine may include a code flow capable of handling an IPI that occurs at least during system startup. Instead of transferring the system to legacy mode to handle the startup IPI and then transferring back to the native mode, the system remains in native mode to handle the startup IPI.

There are a number of embodiments that may be utilized to provide the system access to the non-legacy mode routines. In some embodiments, the non-legacy mode routines are stored in the firmware as a microcode patch in the microcode buffer. Thus, the processor, during boot, walks through the FIT 430, notices the microcode buffer pointer 437, jumps to the microcode buffer 470 and/or effects a "microcode patch" operation using the buffer as the patch location, and reads the non-legacy handler routines 440 to handle one of the events specified in the routines.

In some embodiments, the non-legacy mode routines are stored in the startup ACM 450, which the processor manufacturer may implement. Thus, the processor, during boot, walks through the FIT 430, notices the startup ACM pointer 435, jumps to the startup ACM 450, and reads the non-legacy handler routines stored in the startup ACM 450 to handle one of the events specified in the routines. Notably, during boot, the processor would key on the non-legacy reset state handler routine.

In other embodiments, the non-legacy mode routines are stored in one or more non-legacy restart routine page tables 440. Thus, during a system restart (reboot), the processor walks through the FIT 430, notices the restart template pointer 433, and since the system has been restarted, the processor utilizes the non-legacy reset state handler routine.

In yet other embodiments, further pointers may be located in the microcode buffer 470 or the startup ACM 450 pointing to one or more of the non-legacy routines stored in the non-legacy startup routine page tables 440. For example, on a system reset, the processor may walk through the FIT 430, notice the startup ACM pointer 435, jump to the startup ACM 450, read an additional pointer in the startup ACM 450 that references a page table in the non-legacy startup routine page tables 440, and jump to the routine at the page table for handling. The startup ACM 450 can further look at additional table entries, such as the microcode in 470 or the boot-script in 460, and effect the microcode patch operation using location in 437 as the operand and interpret/execute the boot script 460 entries, respectively.

In some embodiments, each time one of the processor events (e.g. reset, a SMI, or a startup IPI, among others) occurs, the processor goes through the entire walkthrough of one of the embodiments described above to reach the handler routine associated with the event. Although, in many other embodiments, for any event that is not a system reset, the processor may not require repeating all of the jumps to get to the handler routine. Specifically, in many embodiments, after the processor locates the set of non-legacy mode routines, a notifier is set which tells the processor that non-legacy handler routines for specific processor events are available. Thus, if an interrupt event occurs, the processor may have the routines, read previously during a reset event, resident in a location readily available for efficient handling.

For example, a specific location in the firmware 400 may be pre-designated for these routines and a non-legacy handler (NLH) notification bit may be set in a register in the processor to notify the processor to look there because the bit was set during the initial routine walkthrough upon reset. In another embodiment, the NLH routines may be resident in a cache, in a memory device, or in a buffer that the processor is aware of so that the entire FIT 430 walkthrough is not necessary apart from a reset event.

In an embodiment of the invention, the initial hypervisor, or MVMM 451 may reside in the startup ACM block 450. Thus, during the boot phase, while the FIT 430 is being traversed for execution, a trusted hypervisor may be utilized to handle critical boot operations. The startup ACM 450 is used to ensure that the SEC code portion of the BIOS is trusted and valid code.

Figure 6:
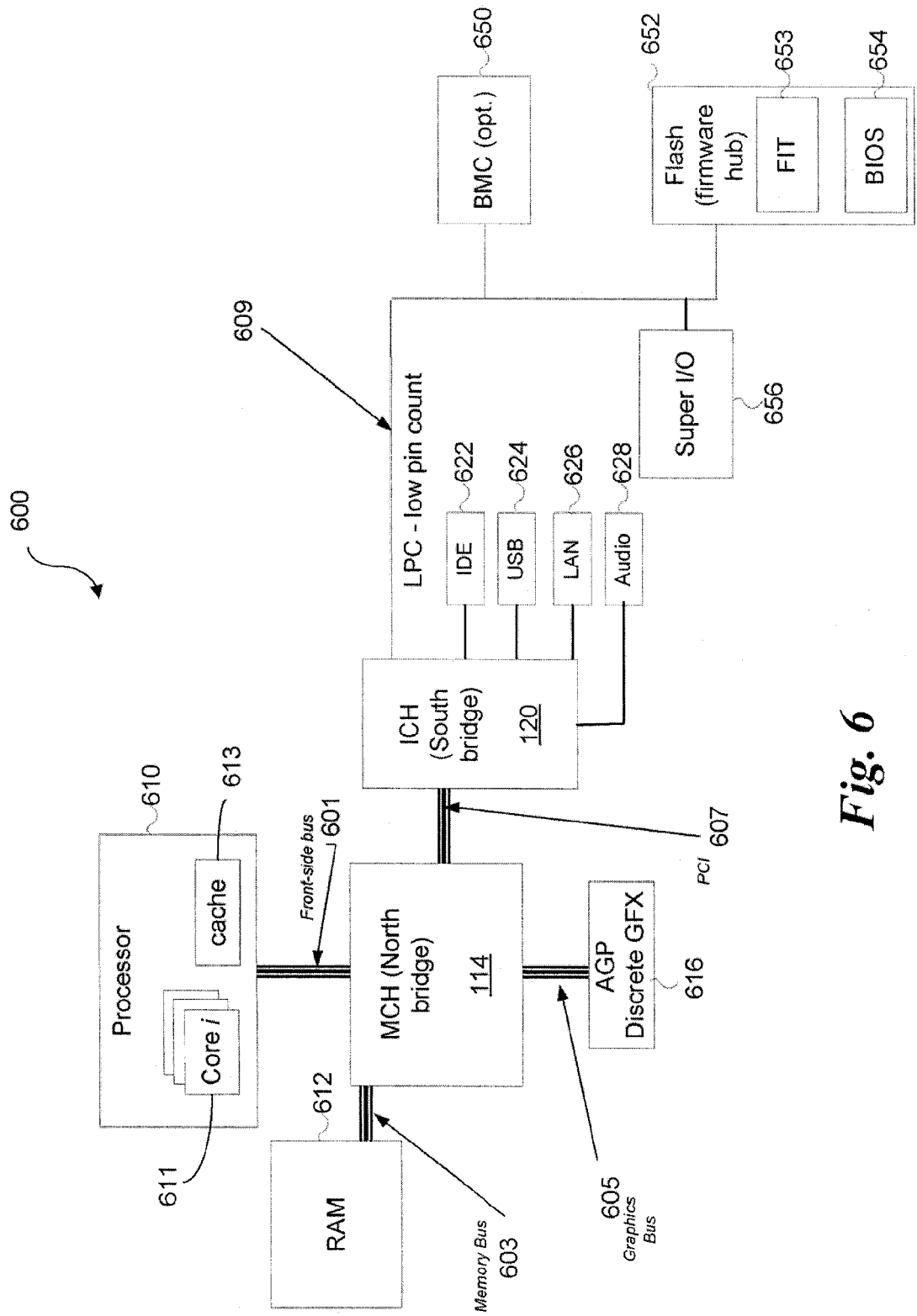
FIG. 6 is a block diagram of a system including main processor elements and the Flash memory part which contains the Firmware Interface Table (FIT), along with BIOS modules referenced/validated by FIT, according to an embodiment of the invention.

Referring now to FIG. 6, there is shown a block diagram of a system 600 including main processor elements and the Flash memory part which contains the Firmware Interface Table (FIT), along with BIOS modules referenced/validated by FIT. In an embodiment of the invention, processor 610 communicates with a memory controller hub (MCH) 614, also known as North bridge, via the front side bus 601. The MCH 614 communicates with system memory 612 via a memory bus 603. The MCH 614 may also communicate with an advanced graphics port (AGP) 616 via a graphics bus 605. The MCH 614 communicates with an I/O controller hub (ICH) 620, also known as South bridge, via a peripheral component interconnect (PCI) bus 607. The ICH 620 may be coupled to one or more components such as PCI hard drives (not shown), legacy components such as IDE 622, USB 624, LAN 626 and Audio 628, and a Super I/O (SIO) controller 656 via a low pin count (LPC) bus 609.

Processor 610 may be any type of processor capable of executing software, such as a microprocessor, digital signal processor, microcontroller, or the like. Though FIG. 6 shows only one such processor 610, there may be one or more processors in platform hardware 600 and one or more of the processors may include multiple threads, multiple cores 611, or the like. Processor 610 may be directly coupled to cache memory 613. In a multi-core or multi-processor environment, there may be multiple cache memory units coupled to one or more processing units, cores or processors, in the processor 610. This cache memory 613 may be configured to execute as random access memory (RAM), e.g., cache-as-RAM (CAR) before system RAM has been initialized. In an embodiment, some firmware code may execute in place in Flash memory 652 and some code may execute in CAR during the boot process.

Memory 612 may be a hard disk, a floppy disk, random access memory (RAM), read only memory (ROM), Flash memory, or any other type of medium readable by processor 110. Memory 612 may store instructions for performing the execution of method embodiments of the present invention.

Non-volatile memory, such as Flash memory 652, may be coupled to the IO controller via a low pin count (LPC) bus 609. The BIOS firmware 654 typically resides in the Flash memory 652 and boot up will execute instructions from the Flash, or firmware. Some portions may execute from CAR, as discussed above. The firmware hub 652 may also contain a firmware interface table (FIT) 653 and pointers from the FIT to other executable modules in the firmware 652.

In some embodiments, platform 600 is a server enabling server management tasks. This platform embodiment may have a baseboard management controller (BMC) 650 coupled to the ICH 620 via the LPC 609. In other embodiments, the platform 600 may be coupled to an independent microprocessor having access to the firmware, where the independent microprocessor (not shown) has a separate out of band connection and contains a manageability engine code, for instance using Intel® Active Management Technology.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for protecting boot phases of a platform having virtualization technology capabilities, comprising:
    a processor coupled to a non-volatile firmware storage device;
    a trusted software module for controlling an initial boot phase of the platform, the software module stored in the non-volatile firmware storage device, wherein the trusted software module is to be executed as a privileged component in a virtual machine to control boot operations;
    system cache memory coupled to the processor, wherein a portion of the cache memory is to be configured as cache-as-RAM (CAR), and wherein the trusted software module is to be initially executed as resident in the CAR, prior to discovery and initialization of system random access memory (RAM), and once system RAM is initialized, the trusted software module is to be migrated to run in system RAM;
    a second software module to be launched by the trusted software module running in system RAM to control a next boot phase of the platform, wherein the second software module is to execute as a privileged component in a virtual machine; and
    a launch control policy (LCP) unit to verify that a software module is authorized before allowing the software module to be launched, wherein the LCP unit is to retrieve launch policy configuration data from non-volatile storage coupled to a trusted platform module (TPM NV);
    wherein the trusted software module is to be verified by microcode in the platform and successive software modules launched in a chain from the trusted software module cause the LCP unit to automatically verify the successive software modules against the policy configuration data before launching.

2. The system as recited in claim 1, wherein the trusted software module executes a pre-extensible firmware interface (PEI) phase of platform boot, and where the second software module executes a driver execution environment (DXE) phase of platform boot.

3. The system as recited in claim 2, further comprising:
    a third software module comprising a virtual machine monitor (VMM) to be launched by the second software module once DXE phase initialization is completed.

4. The system as recited in claim 1, wherein the successive software modules are identified by a hash value and the LCP unit is to compare the identified hash value with hash values stored in the TPM NV.

5. The system as recited in claim 1, further comprising an entry point verification unit to verify that a firmware interface table (FIT) stored on the non-volatile firmware storage device points to authorized boot of a security (SEC) software-module code using an hardware-authenticated code module prior to launching of the trusted software module, wherein the FIT identifies the location of the trusted software module.

6. A method for protecting boot phases of a platform having virtualization technology capabilities, comprising:
    entering protected mode in the platform, responsive to a platform reset or power-on;
    enabling cache coupled to a boot processor in the platform to act as random access memory, referred to as cache-as-RAM (CAR);
    launching a first trusted software module, as a currently executing trusted software module, to execute in CAR, the first trusted software module retrieved from secure firmware storage coupled to the platform;
    initializing system random access memory (RAM);
    migrating the trusted software module to run in a privileged virtual machine in system RAM;
    launching at least one successive trusted software module, as a new currently running trusted software module, in accordance with at least one launch control policy (LCP) accessible to the currently running trusted software module, wherein the at least one launch control policy determines whether the at least one successive trusted software module is valid, and if the successive trusted software module is not valid, then causing the platform boot to fail; and
    launching the first trusted software module by a security phase (SEC) of initial boot phase, wherein the SEC is authenticated by microcode coupled to the platform, and wherein the first trusted software module comprises a simple virtual machine monitor.

7. The method as recited in claim 6, wherein the currently running trusted software module controls page allocation and generates an exclusion list to block lesser privileged software modules from accessing protected memory areas.

8. The method as recited in claim 7, further comprising:
    retrieving policy data from a trusted platform module (TMP) non-volatile memory store (TMPNV) by a launch control policy (LCP) check unit;
    comparing the retrieved policy data with a measured value for a successive trusted software module; and
    determining whether the successive trusted software module is valid, and if so, then launching the successive trusted software module in a virtual machine, but if not, then causing the platform boot to fail.

9. The method as recited in claim 6, wherein a launch control policy (LCP) check unit comprises microcode coupled to the platform to authenticate each successive trusted software module before allowing the successive trusted software module to be launched.

10. The method as recited in claim 9, further comprising:
    verifying BIOS code by the LCP check unit before allowing the BIOS code to execute.

11. A computer readable non-transitory storage medium having instructions stored thereon for protecting boot phases of a platform having virtualization technology capabilities, the instruction when executed on the platform, cause the platform to:
    enter protected mode in the platform, responsive to a platform reset or power-on; enable cache coupled to a boot processor in the platform to act as random access memory, referred to as cache-as-RAM (CAR);
    launch a first trusted software module, as a currently executing trusted software module, to execute in CAR, the first trusted software module retrieved from secure firmware storage coupled to the platform;
    initialize system random access memory (RAM);
    migrate the trusted software module to run in a privileged virtual machine in system RAM;
    launch at least one successive trusted software module, as a new currently running trusted software module, in accordance with at least one launch control policy (LCP) accessible to the currently running trusted software module, wherein the at least one launch control policy determines whether the at least one successive trusted software module is valid, and if the successive trusted software module is not valid, then causing the platform boot to fail; and
    launch the first trusted software module by a security phase (SEC) of initial boot phase, wherein the SEC is authenticated by microcode coupled to the platform, and wherein the first trusted software module comprises a simple virtual machine monitor.

12. The medium as recited in claim 11, wherein the currently running trusted software module controls page allocation and generates an exclusion list to block lesser privileged software modules from accessing protected memory areas.

13. The medium as recited in claim 12, further comprising instructions to:
retrieve policy data from a trusted platform module (TMP) non-volatile memory store (TMPNV) by a launch control policy (LCP) check unit;
compare the retrieved policy data with a measured value for a successive trusted software module; and
determine whether the successive trusted software module is valid, and if so, then launch the successive trusted software module in a virtual machine, but if not, then cause the platform boot to fail.

14. The medium as recited in claim 11, wherein a launch control policy (LCP) check unit comprises microcode coupled to the platform to authenticate each successive trusted software module before allowing the successive trusted software module to be launched.

15. The medium as recited in claim 14, further comprising instructions to:
verify BIOS code by the LCP check unit before allowing the BIOS code to execute.

16. A method for protecting boot phases of a platform having virtualization technology capabilities, comprising:
entering protected mode in the platform, responsive to a platform reset or power-on;
enabling cache coupled to a boot processor in the platform to act as random access memory, referred to as cache-as-RAM (CAR);
launching a first trusted software module, as a currently executing trusted software module, to execute in CAR, the first trusted software module retrieved from secure firmware storage coupled to the platform;
initializing system random access memory (RAM);
migrating the trusted software module to run in a privileged virtual machine in system RAM;
launching at least one successive trusted software module, as a new currently running trusted software module, in accordance with at least one launch control policy (LCP) accessible to the currently running trusted software module, wherein the at least one launch control policy determines whether the at least one successive trusted software module is valid, and if the successive trusted software module is not valid, then causing the platform boot to fail;
retrieving policy data from a trusted platform module (TMP) non-volatile memory store (TMPNV) by a launch control policy (LCP) check unit;
comparing the retrieved policy data with a measured value for a successive trusted software module; and
determining whether the successive trusted software module is valid, and if so, then launching the successive trusted software module in a virtual machine, but if not, then causing the platform boot to fail.

17. A computer readable non-transitory storage medium having instructions stored thereon for protecting boot phases of a platform having virtualization technology capabilities, the instruction when executed on the platform, cause the platform to:
enter protected mode in the platform, responsive to a platform reset or power-on; enable cache coupled to a boot processor in the platform to act as random access memory, referred to as cache-as-RAM (CAR);
launch a first trusted software module, as a currently executing trusted software module, to execute in CAR, the first trusted software module retrieved from secure firmware storage coupled to the platform;
initialize system random access memory (RAM);
migrate the trusted software module to run in a privileged virtual machine in system RAM;
launch at least one successive trusted software module, as a new currently running trusted software module, in accordance with at least one launch control policy (LCP) accessible to the currently running trusted software module, wherein the at least one launch control policy determines whether the at least one successive trusted software module is valid, and if the successive trusted software module is not valid, then causing the platform boot to fail;
retrieve policy data from a trusted platform module (TMP) non-volatile memory store (TMPNV) by a launch control policy (LCP) check unit;
compare the retrieved policy data with a measured value for a successive trusted software module; and
determine whether the successive trusted software module is valid, and if so, then launch the successive trusted software module in a virtual machine, but if not, then cause the platform boot to fail.

* * * * *